US012116789B2

(12) United States Patent
Lee et al.

(10) Patent No.: US 12,116,789 B2
(45) Date of Patent: Oct. 15, 2024

(54) STRUCTURE CONSTRUCTION APPARATUS

(71) Applicant: KYUNGPOOK NATIONAL UNIVERSITY INDUSTRY-ACADEMIC COOPERATION FOUNDATION, Daegu (KR)

(72) Inventors: Dong Eun Lee, Daegu (KR); Hak Yi, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 593 days.

(21) Appl. No.: 17/424,493

(22) PCT Filed: Mar. 13, 2020

(86) PCT No.: PCT/KR2020/003567
§ 371 (c)(1),
(2) Date: Jul. 20, 2021

(87) PCT Pub. No.: WO2021/025256
PCT Pub. Date: Feb. 11, 2021

(65) Prior Publication Data

US 2022/0081916 A1 Mar. 17, 2022

(30) Foreign Application Priority Data

Aug. 5, 2019 (KR) ........................ 10-2019-0094986

(51) Int. Cl.
*E04G 11/34* (2006.01)
*B28B 3/02* (2006.01)
(Continued)

(52) U.S. Cl.
CPC .............. *E04G 11/34* (2013.01); *B28B 3/022* (2013.01); *B28B 2005/048* (2013.01); *E04G 2011/067* (2013.01)

(58) Field of Classification Search
CPC ... E04G 11/34; E04G 2011/067; E04G 19/00; B28B 1/04; B28B 15/002; B28B 3/022; B28B 2005/048
See application file for complete search history.

(56) References Cited

U.S. PATENT DOCUMENTS

| | | | |
|---|---|---|---|
| 2,339,892 | A | 1/1944 | Urschel |
| 8,375,669 | B2 | 2/2013 | Krayenhoff |

(Continued)

FOREIGN PATENT DOCUMENTS

| | | |
|---|---|---|
| DE | 2922539 | 1/1981 |
| JP | H05-026309 | 4/1993 |

(Continued)

*Primary Examiner* — Jerzi H Moreno Hernandez
(74) *Attorney, Agent, or Firm* — JCIPRNET

(57) ABSTRACT

A structure construction apparatus including a frame unit, a formwork unit and a compacting unit is provided. The frame unit is provided on a ground on which a structure is to be constructed. The formwork unit is mounted on the frame unit, and maintains structural materials in a form to be constructed. The compacting unit is disposed to be adjacent to the formwork unit so as to compact the structural materials provided in the formwork unit. The formwork unit and the compacting unit are configured to move through the frame unit so as to automatically construct the structure.

7 Claims, 11 Drawing Sheets

(51) Int. Cl.
*B28B 5/04* (2006.01)
*E04G 11/06* (2006.01)

(56) References Cited

U.S. PATENT DOCUMENTS

| | | | | |
|---|---|---|---|---|
| 2005/0196484 | A1* | 9/2005 | Khoshnevis | B28B 1/001 425/463 |
| 2019/0217499 | A1* | 7/2019 | Toncelli | B28B 7/384 |
| 2020/0114540 | A1* | 4/2020 | Maffett | E04C 2/16 |
| 2020/0282593 | A1* | 9/2020 | Le Roux | B28B 1/001 |

FOREIGN PATENT DOCUMENTS

| | | |
|---|---|---|
| JP | 3211755 | 8/2017 |
| KR | 100239913 | 10/1999 |
| KR | 200317947 | 6/2003 |
| KR | 100449541 | 9/2004 |
| KR | 100536772 | 12/2005 |
| KR | 101583239 | 1/2016 |
| KR | 20180088021 | 8/2018 |

* cited by examiner

STRUCTURE CONSTRUCTION APPARATUS

TECHNICAL FIELD

Disclosed is a structure construction apparatus. More particularly, disclosed are an automatic structure construction apparatus for automatically installing, dismantling, and moving a formwork, and also automatically performing a flattening and compacting of a provided structural material and a method of constructing a structure by controlling the automatic structure construction apparatus.

RELATED ART

In general, a formwork is installed to build a building structure into a predetermined shape and size. A formwork, which is manufactured in a shape desired to be made, is made of various materials such as plywood, hard fiber board, synthetic resin, aluminum panel, and steel plate, etc. depending on a construction method selected. Materials (i.e., concrete and soil, etc.) constituting a building structure are poured into the formwork and the formwork which functions to maintain the materials at an accurate position and shape. When compacting the structural materials poured into the formwork, lateral pressure is applied to the formwork and a strut (including a joist, a yoke, a brace, and a support) should be inevitably installed to maintain a position and a shape of the formwork by coping with the lateral pressure. Hereafter, the formwork is the one which includes the strut.

For example, a rammed earth wall construction method, which is generally used for earth structure, uses a formwork as well. The rammed earth wall construction method refers to a method of constructing a rammed earth wall and forms an earth wall by installing a wall formwork, filling the wall formwork with soil, and then compacting the soil filled into the wall formwork. Existing rammed earth wall construction method is labor intensive. In addition, the method dose not lend itself to productivity since a process of mobilizing, arranging, installing, dismantling, cleaning, applying a peeling material to, relocating, and reinstalling the formwork needs to be repeated. That is why a formwork process that is applied to a rammed earth wall construction occupies 50% or more of a total construction time, hence, being a costly process. In addition, a compaction process of installing the formwork and then flattening and compacting the soil filled in the formwork has a great impact on productivity of the rammed earth wall construction since labor needs to manually apply an impact force to the materials.

A wall formwork for rammed earth construction and a wall construction method using the same are disclosed in Korean Patent Registration No. 10-0536772 filed on Sep. 29, 2003.

DETAILED DESCRIPTION

Technical Subject

An object of an example embodiment is to provide an apparatus that may improve work efficiency and productivity by automating a structure construction process that includes installing, dismantling, and relocating a formwork, and flattening and compacting a structural material.

An object of an example embodiment is to provide a movable construction apparatus that may automatically install, dismantle, and relocate a formwork and rammer in compliance with a preset compaction path.

An object of an example embodiment is to provide an apparatus that requires only the minimum manpower by means of the automation of a formwork process and a compaction process, hence, reducing a construction cost and allowing 3 shifts per day with the minimum manpower.

An object of an example embodiment is to exclude an accident hampering workers' safety and health and a productivity decrease attributed to labor fatigue that may be aggravated during a manual compaction.

An object of an example embodiment is to provide an apparatus for constructing a structure with uniform quality.

An object of an example embodiment is to provide a construction apparatus that allows 3 shifts per day with the minimum manpower by replacing a manpower-dependent process with an automatic labor-saving process.

An object of an example embodiment is to provide an apparatus that enables even a novice to construct a standardized structure according to a set manual.

An object of an example embodiment is to provide an apparatus that may exclude extensive usage of formwork materials and labors used for a formwork process.

An object of an example embodiment is to provide an apparatus that uses only a single formwork set repeatedly during the execution of a formwork process.

An object of an example embodiment is to provide a formwork fastening apparatus repeatedly available by replacing a single set of a joist, a yoke, a brace, and a support that bear lateral pressure applied to a formwork and maintain a position and a shape of the formwork.

An object of an example embodiment is to provide an apparatus that may prevent a structural material from falling off from a structure when dismantling the formwork.

Objects to be solved in example embodiments are not limited to the aforementioned objects and other objects not described herein may be clearly understood by those skilled in the art from the following description.

Technical Solution

A structure construction apparatus according to an example embodiment to accomplish the aforementioned objects includes a frame unit provided on the ground on which a structure is to be constructed; a formwork unit mounted on the frame unit and configured to maintain a structural material in a form to be constructed; and a compacting unit provided to be adjacent to the formwork unit and configured to compact the structural material provided into the formwork unit. The formwork unit and the compacting unit may be configured to automatically build a structure while moving along the frame unit.

According to an aspect, the frame unit may include vertical frames configured to erect at positions spaced apart at both sides, respectively, based on a construction position; a horizontal frame provided horizontally relative to the ground between the vertical frames; and a pair of movable frames each configured to be movable in a vertical direction along the vertical frames, and the formwork unit and the compacting unit may be mounted to the movable frame.

According to an aspect, the frame unit may further include a first rail installed between the vertical frames; and a second rail installed between the pair of movable frames, each of the pair of movable frames may be configured to be movable in the vertical direction along the first rail, the formwork unit and the compacting unit may be configured to be movable in a horizontal direction along the second rail, and the formwork unit and the compacting unit may be configured to move to a construction position along the first rail or the second rail and to consecutively construct the structure.

According to an aspect, the formwork unit may include a formwork base movably mounted on the frame unit; and at least two formwork plates spaced apart to face each other at one end of the formwork base, the formwork base may be configured to move the at least two formwork plates to a construction position along the frame unit, and the structural material may be provided between the at least two formwork plates .

According to an aspect, the formwork unit may further include a formwork plate adjuster configured to adjust a separation distance between the formwork plates, the formwork plate adjuster may be configured to adjust and maintain the separation distance between the formwork plates to match a thickness of the structure, and the formwork plate adjuster may be configured to remove the formwork plates from the structure when construction of the structure is completed.

According to an aspect, the compacting unit may include a guide portion connected to the formwork unit or the frame unit; a compaction base configured to move along the guide portion; and a compacting portion provided at one end of the compaction base, the compacting portion may be configured to perform a repetitive motion in a vertical direction within the formwork unit and to compact the structural material provided to the formwork unit, and the compaction base may be configured to move a rammer of the compacting portion in the formwork unit while moving along the guide portion.

According to an aspect, the formwork unit may further include a peeling portion present between the structure material and the formwork plate, and the peeling portion may be provided between the formwork unit and the structure and configured to prevent adhesion between the formwork unit and the structure.

According to an aspect, the peeling portion may include a peeling member configured to detachably attach to the surface of the formwork plate; and a suction member configured to vacuum suck the peeling member and to fasten the peeling member to the formwork plate, and the peeling member may be replaceable.

According to an aspect, the structure construction apparatus may further include a structural material providing unit provided to be adjacent to the formwork unit. The structural material providing unit may be configured to transport the structural material and to provide the same to the formwork unit.

According to an aspect, the frame unit may further include a third rail configured to be orthogonal to the first rail and the second rail, and the formwork unit and the compacting unit may be configured to be movable along the third rail.

According to an aspect, the structure construction apparatus may further include a rotator positioned above the formwork unit and the compacting unit. The rotator may be configured to change a construction direction by rotating the formwork unit and the compacting unit.

According to an aspect, the frame unit may further include a frame wheel mounted at a lower end of the vertical frame, and the frame wheel may be detachably mounted to one of the vertical frames and a height of the vertical frame may be adjusted.

According to an aspect, the formwork unit may include at least two formwork sub-plates spaced apart to face each other at both ends of the at least two formwork plates; and a formwork sub-plate adjuster configured to move the formwork sub-plates in a vertical direction, and each of the at least two formwork sub-plates may be controlled in the vertical direction by the formwork sub-plate adjuster to open and close one of the both ends of the at least two formwork plates.

According to an aspect, the formwork plate adjuster may include a first ball screw horizontally provided at one end of each of the at least two formwork plates; a second ball screw provided to be parallel to the first ball screw at another end of each of the at least two formwork plates; and a bevel gear shaft provided to be orthogonal to the first ball screw and the second ball screw, both ends of the bevel gear shaft may be geared at one end of the first ball screw and one end of the second ball screw, respectively, and the separation distance between the formwork plates may be adjusted by rotational driving of the first ball screw.

An automatic structure construction method according to an example embodiment to accomplish the objects may use a structure construction apparatus including a frame unit provided on the ground on which a structure is to be constructed, a formwork unit configured to vertically or horizontally move such that at least two formwork plates are automatically installed and removed at a construction position, and a compacting unit configured to move to a position on a structural material to be compacted and to compact the material through a repetitive vertical movement of a compacting portion, and may include providing the frame unit on the ground; moving the formwork unit to a start position of a first floor and compacting the structural material using the compacting unit; and determining whether construction of the first floor is completed.

According to an aspect, the moving of the formwork unit to the start position of the first floor and the compacting of the structural material using the compacting unit may include moving the formwork unit to the start position of the first floor; adjusting a separation distance between the formwork plates such that a set structure shape is maintained; providing the structural material between the formwork plates; moving the compacting unit on the structural material; compacting the structural material using the compacting portion; and removing the formwork plates from the structure.

According to an aspect, the automatic structure construction method may further include, when it is determined that construction of the first floor is completed, moving the formwork unit and the compacting unit to a start position of a second floor and repeating a compacting process.

According to an aspect, the automatic structure construction method may further include, when it is determined that construction of the first floor is not completed, moving the formwork unit and the compacting unit to a neighboring position of the first floor and repeating a compacting process.

Effect

According to a structure construction apparatus of an example embodiment, it is possible to improve work efficiency and productivity by automating a structure construction process that includes installing, dismantling, and moving a formwork, and flattening and compacting a structural material.

According to a structure construction apparatus of an example embodiment, it is possible to provide a movable construction apparatus that may automatically install, dismantle, and move a formwork in compliance with a preset compaction path.

According to a structure construction apparatus of an example embodiment, since only the minimum manpower is required through automation of a formwork process and a compaction process, it is possible to reduce a construction cost and to allow 3 shifts per day with the minimum manpower.

According to a structure construction apparatus of an example embodiment, it is possible to exclude an accident involved in workers' safety and health and a productivity decrease caused by aggravated fatigue of labor power that may occur during a manual work by manpower.

According to a structure construction apparatus of an example embodiment, it is possible to construct a structure with uniform quality.

According to a structure construction apparatus of an example embodiment, it is possible to allow 3 shifts per day with the minimum manpower by replacing a manpower-dependent process with an automatic labor-saving process.

According to a structure construction apparatus of an example embodiment, it is possible to enable even a novice to construct a standardized structure according to a set manual.

According to a structure construction apparatus of an example embodiment, it is possible to exclude a formwork material and labor used for a formwork process.

According to a structure construction apparatus of an example embodiment, it is possible to repeatedly use only a single small formwork set during execution of a formwork process.

According to a structure construction apparatus of an example embodiment, a repetitive use is possible by replacing a single set of a joist, a yoke, a brace, and a support that bear lateral pressure applied to a formwork and maintain a position and a shape of the formwork.

According to a structure construction apparatus of an example embodiment, it is possible to prevent a structural material from falling off from a structure when dismantling the formwork.

Effects of the structure construction apparatus according to example embodiments are not limited to the aforementioned effects and other effects not described herein may be clearly understood by those skilled in the art from the following description.

Figure 1:
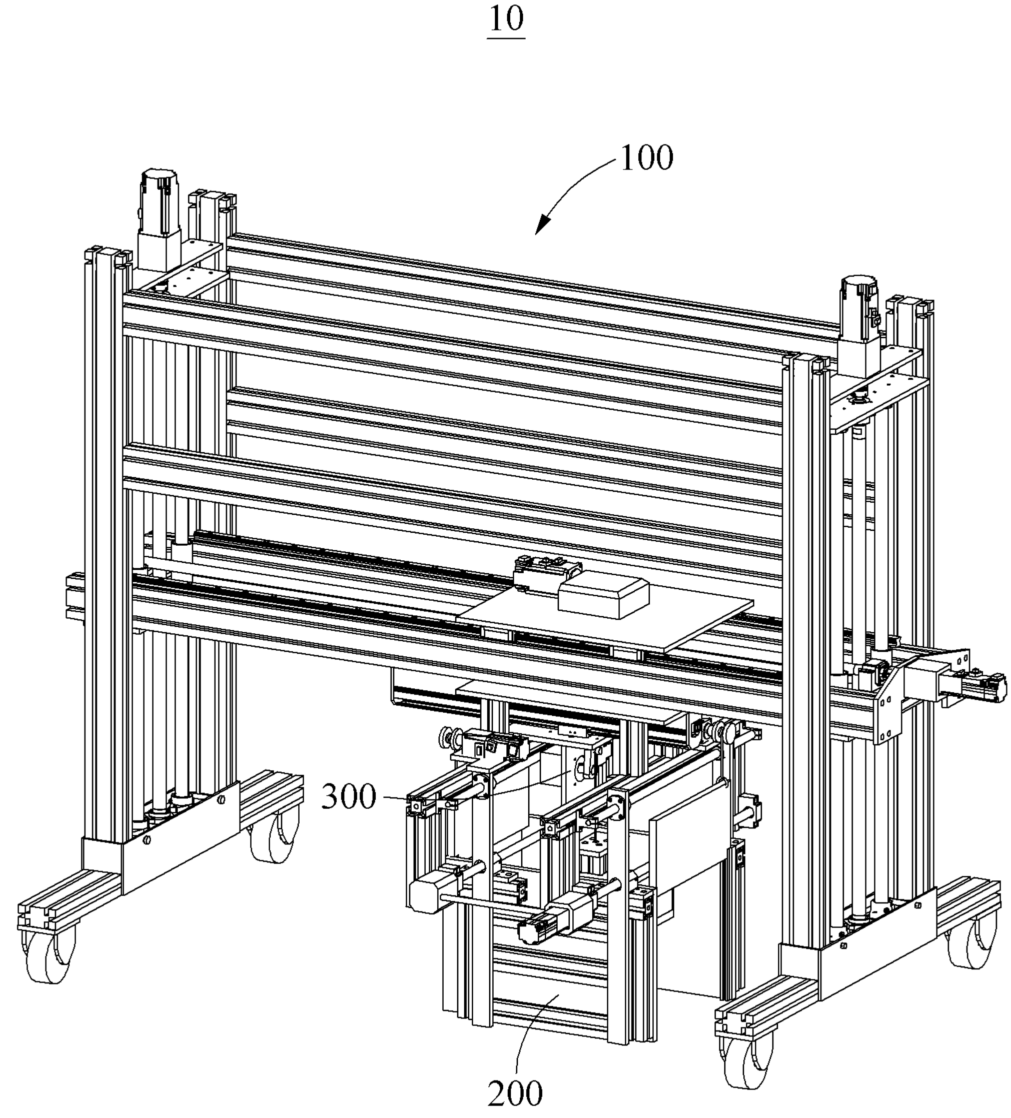
FIG. 1 illustrates a structure construction apparatus according to an example embodiment.

The following drawings attached herein are provided as an example embodiment of the present invention and serve to further provide understanding of the technical spirit of the invention with the detailed description of the invention and thus, the present invention should not be interpreted without being limited to description illustrated in the drawings.

BEST MODE

Hereinafter, example embodiments are described with reference to the accompanying drawings. In assigning reference numerals to components in the respective drawings, it should be noted that like reference numerals refer to like elements although they are illustrated in different drawings. Also, in describing example embodiments, when it is deemed detailed description related to known configuration or functions makes it difficult to understand the example embodiments, the detailed description is omitted.

Also, in describing components of example embodiments, the terms "first," "second," "A," "B," "(a)," and "(b)" may be used. Each of these terminologies is not used to define an essence, order or sequence of a corresponding component but used merely to distinguish the corresponding component from other component(s). Also, when it is described that one component is "connected," "coupled," or "accessed" to another component, it may be understood that the one component is directly connected or accessed to another component or that still other component is "connected," "coupled," or "accessed" between the two components.

A component including a common function with a component included in an example embodiment is described using the same name in another example embodiment. Unless described otherwise, description related to the example embodiment may apply to the other example embodiment and detailed description may be omitted within the repetitive range.

FIG. 1 illustrates a structure construction apparatus 10 according to an example embodiment.

Referring to FIG. 1, the structure construction apparatus 10 according to an example embodiment may include a frame unit 100, a formwork unit 200, and a compacting unit 300.

The frame unit 100 may be installed at a position at which a structure is to be constructed on the ground.

For example, the frame unit 100 may be provided in a form in which a plurality of profiles are coupled to support the formwork unit 200 and the compacting unit 300.

The compacting unit 300 may be connected to the formwork unit 200 to be provided to be adjacent to the formwork unit 200, or may be mounted on the frame unit 100 and configured to compact a structural material provided in the formwork unit 200.

Also, the formwork unit 200 and the compacting unit 300 may automatically construct the structure while moving through the frame unit 100.

The structure construction apparatus 10 may further include a structure material providing unit (not shown) and a controller (not shown).

The structural material providing unit may be provided to be adjacent to the formwork unit 200 to transport the structural material and provide the same to the formwork unit 200, or may be mounted to the frame unit 100 to be adjacent to the formwork unit 200.

For example, the structural material providing unit may include a container configured to contain the structural material and a conveyor configured to transport the structural material from the container to the formwork unit 200.

The controller may store a thickness, a length, and a height of the structure set by a user and may control an operation of the formwork unit 200 and the compacting unit 300 based on the information.

The structure construction apparatus 10 according to an example embodiment including the aforementioned frame unit 100 may be, for example, a gantry typed autonomous construction apparatus to which a slipform is mounted. Also, the structure construction apparatus 10 may be attached to a walking forklift and may move horizontally and/or vertically.

Figure 2:
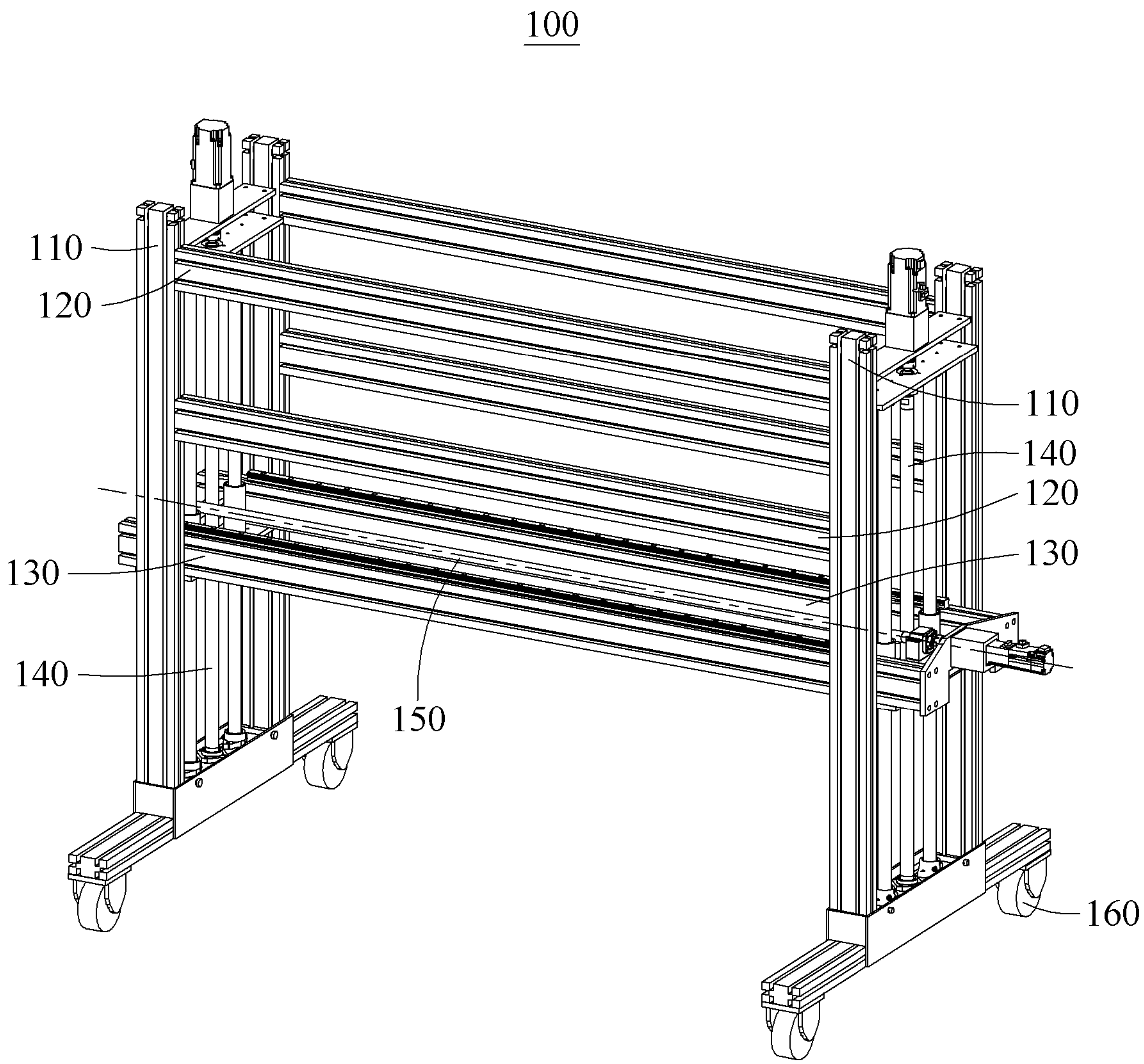
FIG. 2 illustrates a frame unit of a structure construction apparatus according to an example embodiment.

FIG. 2 illustrates the frame unit 100 of the structure construction apparatus 10 according to an example embodiment.

Referring to FIG. 2, the frame unit 100 may include a vertical frame 110, a horizontal frame 120, a movable frame 130, a first rail 140, a second rail 150, and a frame wheel 160.

A plurality of vertical frames 110 may be provided. The plurality of vertical frames 110 may erect at positions spaced apart at both sides, respectively, based on a construction position. For example, referring to FIG. 2, at least two vertical frames 110 may be provided at each side.

The horizontal frame 120 may be provided horizontally relative to the ground between the vertical frames 110 at both sides. For example, a plurality of horizontal frames 120 may be provided in an upper portion or a middle portion of the vertical frame 110. Also, a support structure in which both ends of the horizontal frame 120 may be coupled to the different vertical frames 110, respectively, to stably support the entire structure construction apparatus 10 may be formed.

The movable frame 130 may move in a vertical direction along the vertical frames 110. The movable frame 130 may be provided to be parallel to the horizontal frame 120. A portion of the formwork unit 200 and the compacting unit 300 may be mounted on one side of the movable frame 130. Therefore, the formwork unit 200 and the compacting unit 300 may be moved according to a vertical movement of the movable frame 130.

Also, an actuator may be provided to the movable frame 130 and a separate actuator may be provided to the formwork unit 200 and the compacting unit 300. The movable frame 130, the formwork unit 200, and the compacting unit 300 may vertically or horizontally rotate and move through the actuator.

The first rail 140 may be installed between the vertical frames 110 provided at both sides. Here, the first rail 140 may be provided to be parallel to the vertical frame 110 and orthogonal to the movable frame 130.

The second rail 150 may be installed between a pair of the movable frames 130. Here, the second rail 150 may be provided to be parallel to the movable frames 130 and orthogonal to the first rail 140.

Each of the first rail 140 and the second rail 150 may be provided as a shaft having a thread, for example, a worm shaft, and a motor may be coupled at one end of each of the first rail 140 and the second rail 150.

The first rail 140 may rotate in response to driving of the motor and the rotation may cause the movable frame 130 movably coupled with the first rail 140 to move in a vertical direction. Here, the movable frame 130 may ascend or descend according to a rotational direction of the first rail 140.

In the case of the second rail 150, the second rail 150 may also rotate in response to driving of the motor and the rotation may cause the formwork unit 200 and the compacting unit 300 movably coupled to the second rail 150 to move in a horizontal direction. Here, the formwork unit 200 and the compacting unit 300 may move to the left or to the right according to a rotational direction of the second rail 150.

A relationship between the first rail 140 and the second rail 150 and the formwork unit 200 and the compacting unit 300 is further described with reference to FIGS. 3 and 4.

Referring again to FIG. 2, the frame wheel 160 may be detachably provided and mounted at one end of the vertical frame 110. The frame wheel 160 refers to a portion that contacts the ground and may assist the frame unit 100 to easily move on the ground. Also, a brake is provided to the frame wheel 160 and may fasten the structure construction apparatus 10 to not move at the construction position.

Figure 3:
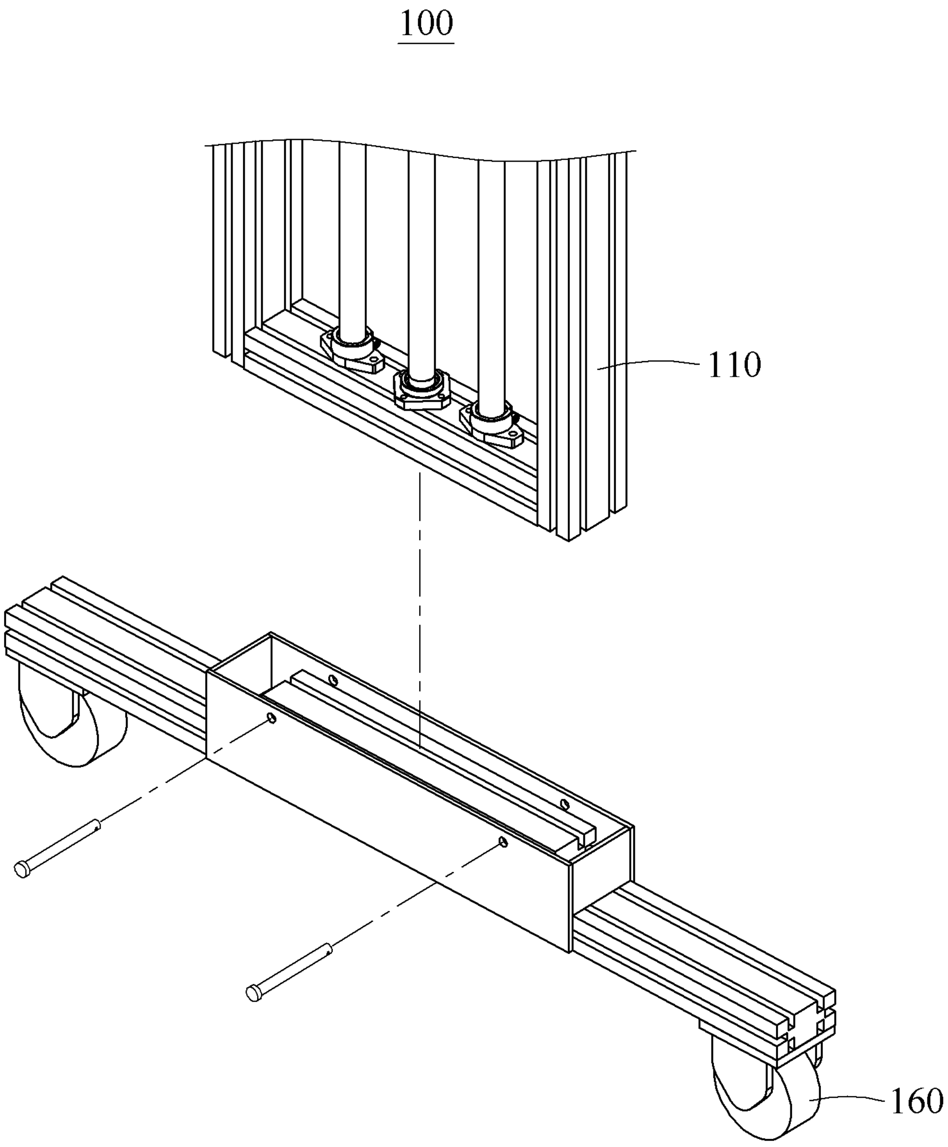
FIG. 3 illustrates a detachable frame unit.

FIG. 3 illustrates the frame unit 100 to which the frame wheel 160 is detachably provided.

Referring to FIG. 3, since the frame wheel 160 is detachable, the structure construction apparatus 10 may move using a separate transportation device or a height of the structure construction apparatus 10 may be adjusted.

Also, the aforementioned frame unit 100 may further include a vertical frame extender (not shown) and a salvage attacher (not shown).

The vertical frame extender may be provided at a lower end of the vertical frame 110 such that both ends of the vertical frame extender may be mounted between the vertical frame 110 and the frame wheel 160.

Also, since the vertical frame extender is height-adjustably provided, an entire height of the structure construction apparatus 10 may be adjusted.

The salvage attacher is provided to attach the structure construction apparatus 10 to a walking forklift and thereby may horizontally and/or vertically move the structure construction apparatus 10.

Hereinafter, the vertical and horizontal movement of the formwork unit 200 and the compacting unit 300 by rotation of the first rail 140 and the second rail 150 is further described in detail with reference to FIGS. 4 and 5.

Figure 4:
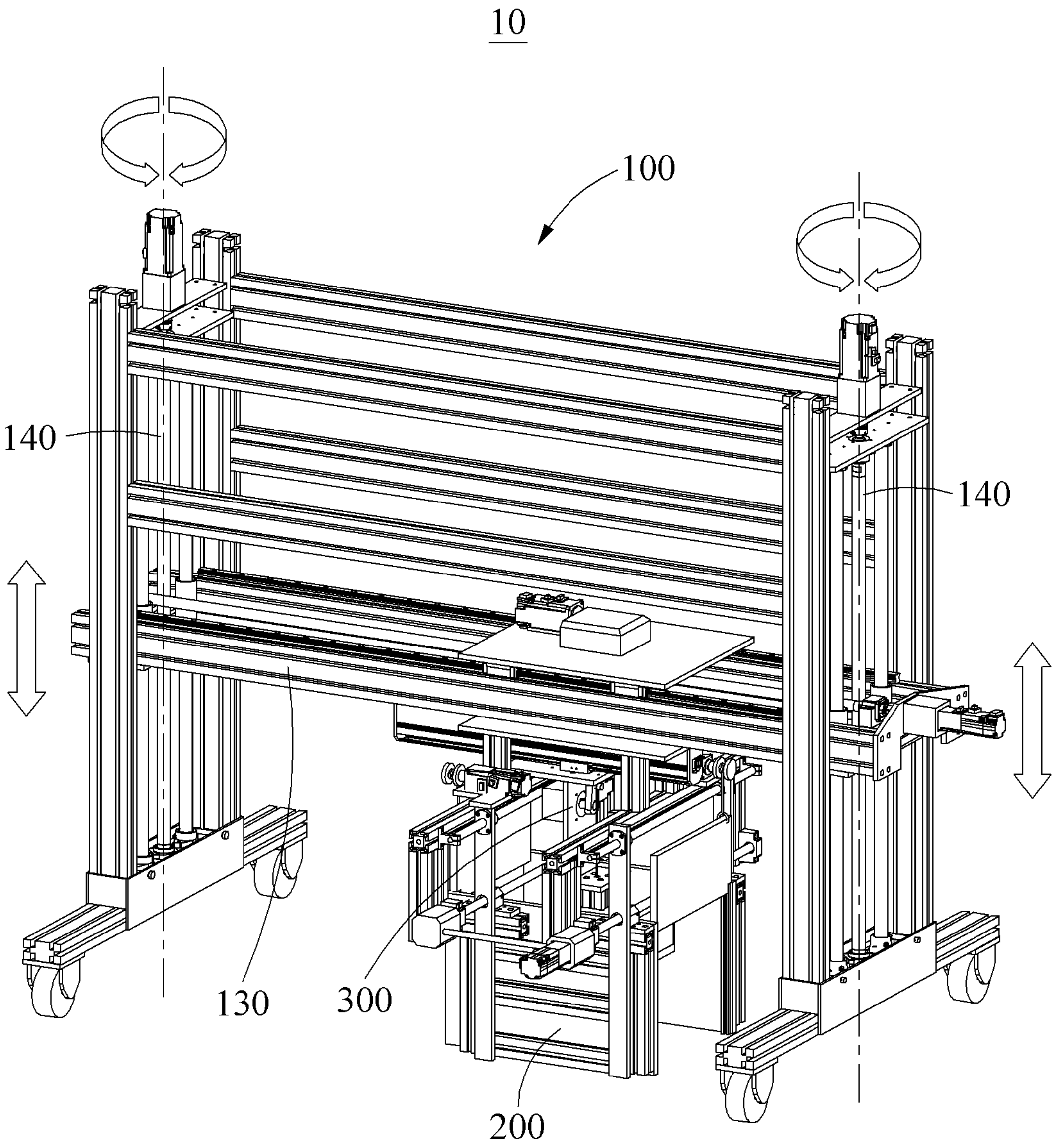
FIG. 4 illustrates a formwork unit and a compacting unit configured to vertically move through a frame unit.

FIG. 4 illustrates the formwork unit 200 and the compacting unit 300 configured to vertically move through the frame unit 100.

Figure 5:
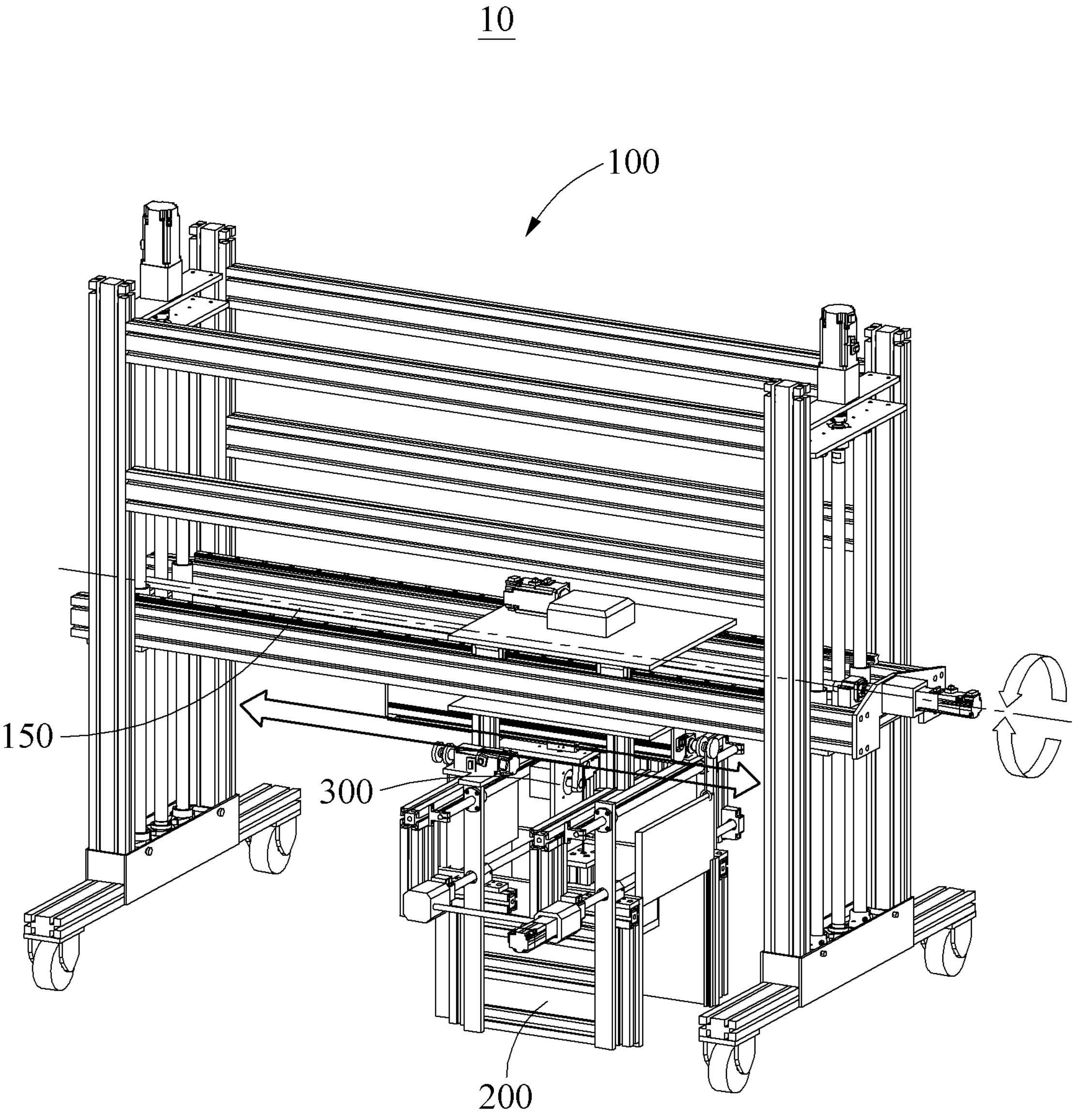
FIG. 5 illustrates a formwork unit and a compacting unit configured to horizontally move on a frame unit.

FIG. 5 illustrates the formwork unit 200 and the compacting unit 300 configured to horizontally move on the frame unit 100.

Referring to FIG. 4, holes each with a size sufficient for the first rail 140 to pass through may be provided at both ends of the movable frame 130, respectively. The first rail 140 installed between the vertical frames 110 provided at one side among the vertical frames 110 provided at both sides may be installed to pass through a hole at one end of the movable frame 130. Likewise, the first rail 140 installed between the vertical frames 110 at the other side may be installed to pass through a hole at another end of the movable frame 130.

Accordingly, the movable frame 130 may move along the first rail 140 and accordingly, the formwork unit 200 and the compacting unit 300 mounted to the movable frame 130 may move in the vertical direction along the first rail 140.

Also, the first rail 140 may further include threadless guide shafts to stabilize coupling with the movable frame 130 and to smoothen a vertical movement of the movable frame 130.

Referring to FIG. 5, the second rail 150 may be coupled at both sides of the movable frame 130. Also, the second rail 150 may be installed to pass through the formwork unit 200 and the compacting unit 300 mounted to the movable frame 130.

Accordingly, the formwork unit 200 and the compacting unit 300 may move in the horizontal direction along the second rail 150.

The frame unit 100 may further include a third rail (not shown).

The third rail may be provided to be orthogonal to all of the first rail 140 and the second rail 150. Also, the third rail may couple with the movable frame 130 and may be installed such that the formwork unit 200 and the compacting unit 300 may move along the third rail.

Accordingly, the formwork unit 200 and the compacting unit 300 may move along the third rail in a direction different from those of the first rail 140 and the second rail 150.

As described above, the structure construction apparatus 10 having the slipform may autonomously move the formwork unit 200 and the compacting unit 300 from the ground to a position at which the structure is to be constructed through the movable frame 130, the first rail 140, and the second rail 150. Also, when a work of a predetermined unit section is completed at the construction position, the formwork unit 200 and the compacting unit 300 may horizontally move to a subsequent section and may repeat the work. When a work of a predetermined unit floor is completed, the formwork unit 200 and the compacting unit 300 may vertically move to a subsequent floor and may perform the work.

Due to the above slipform structure, a construction joint may be absent in the structure constructed using the structure construction apparatus 10. Accordingly, the seamlessness of the structure may be secured and the durability of the structure may also be improved.

Also, using the aforementioned structure construction apparatus 10, it is possible to continuously perform a work on the structure without loss of a work time caused by manpower that requires a predetermined rest time during the work.

Hereinafter, the formwork unit 200 of the structure construction apparatus 10 according to an example embodiment is described in detail with reference to FIGS. 6 and 7.

Figure 6:
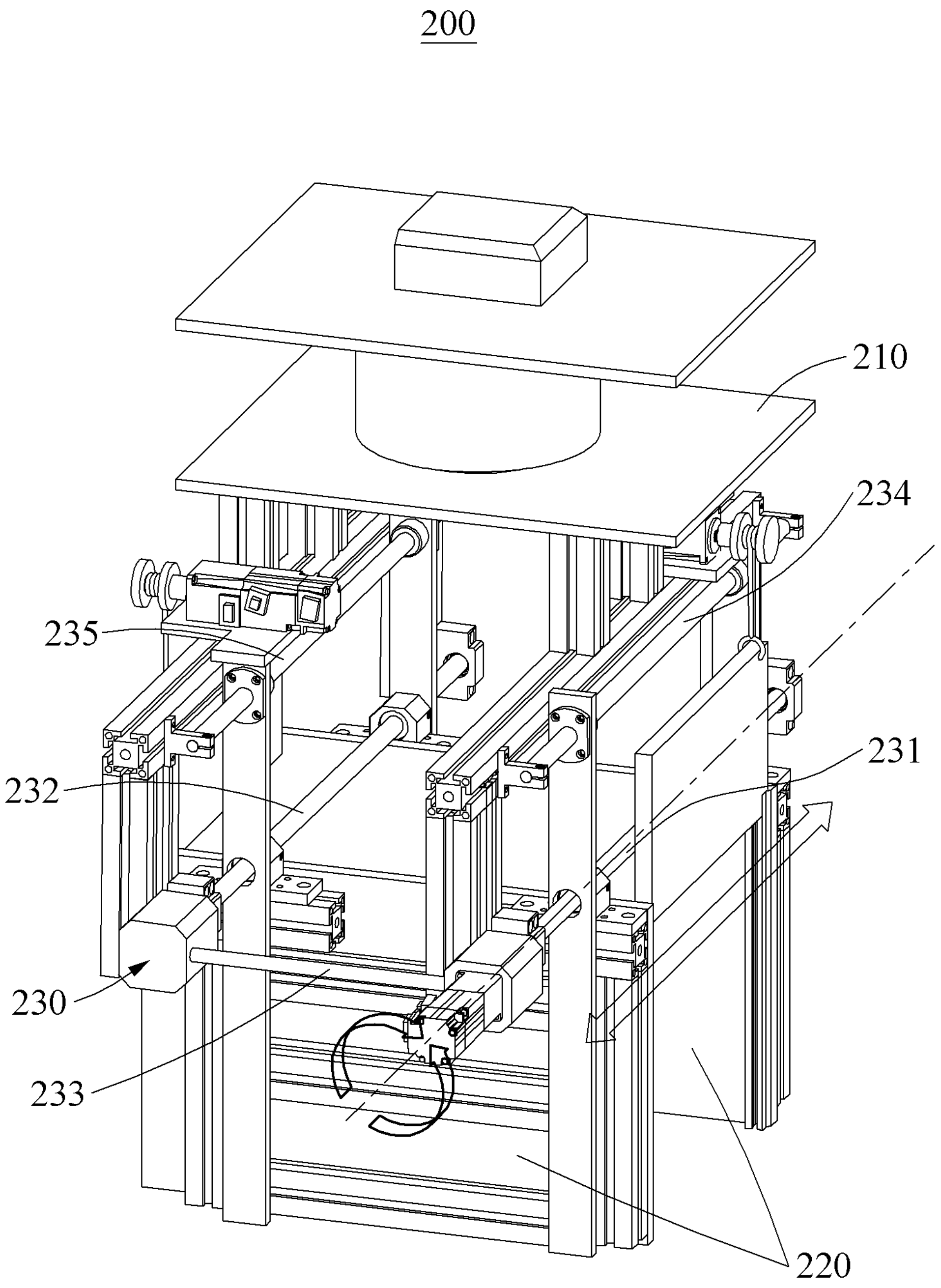
FIG. 6 illustrates a formwork unit in which a separation distance between formwork plates is adjusted through a formwork plate adjuster.

FIG. 6 illustrates the formwork unit 200 in which a separation distance between formwork plates 220 is adjusted through a formwork plate adjuster 230.

Figure 7:
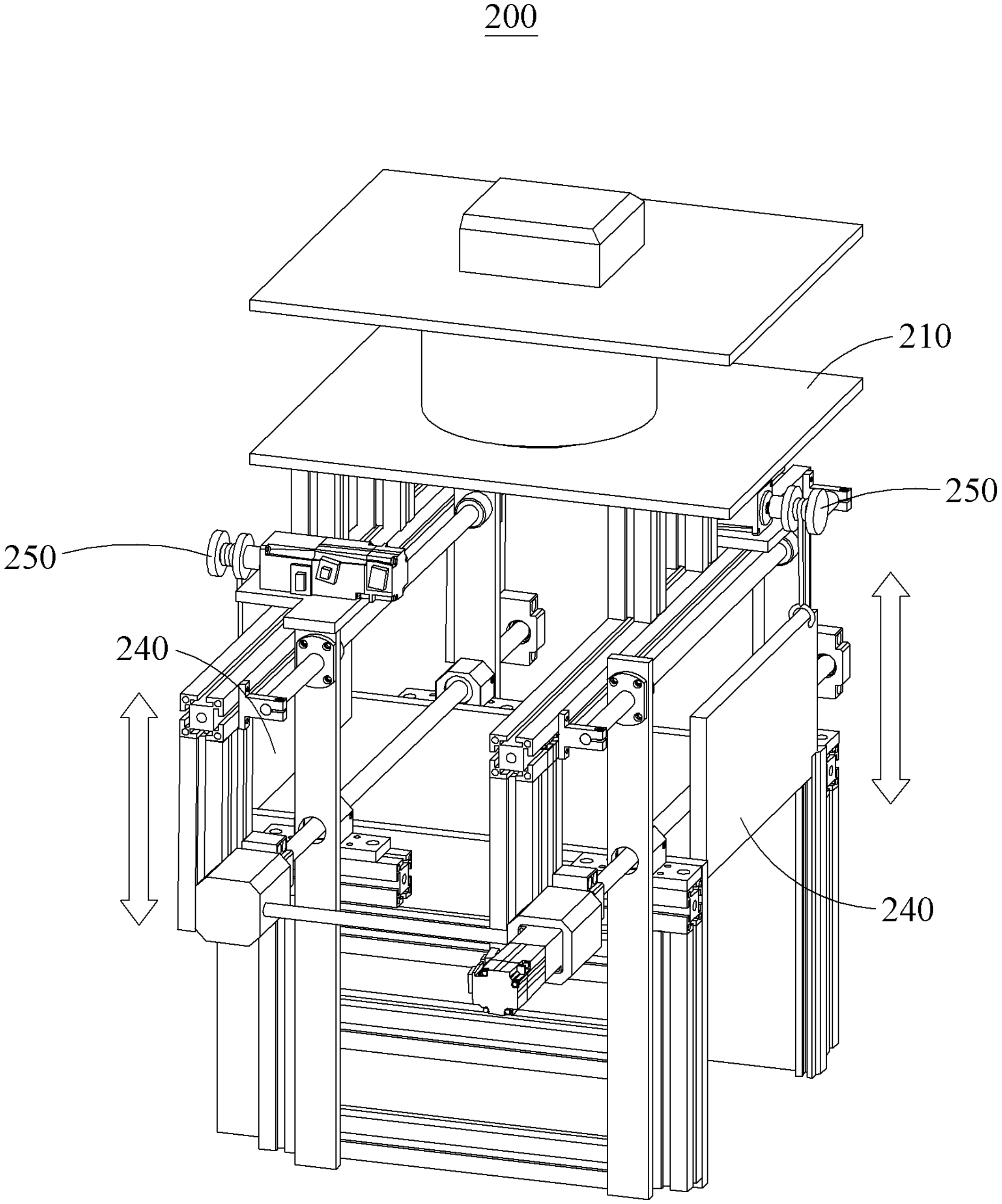
FIG. 7 illustrates a formwork unit in which a formwork sub-plate vertically moves through a formwork sub-plate adjuster.

FIG. 7 illustrates the formwork unit 200 in which a formwork sub-plate 240 vertically moves through a formwork sub-plate adjuster 250.

Referring to FIGS. 6 and 7, the formwork unit 200 may include a formwork base 210, the formwork plate 220, the formwork plate adjuster 230, the formwork sub-plate 240, and the formwork sub-plate adjuster 250.

Referring to FIG. 6, the formwork base 210 may be movably mounted on the frame unit 100.

In detail, a coupling element may be provided in an upper portion of the formwork base 210 and, through this coupling element, the formwork base 210 may be coupled to be slidable on the movable frame 130. Also, a hole through which the second rail 150 passes may be formed in the formwork base 210 and the formwork base 210 may be coupled to be movable along the second rail 150.

Also, the formwork base 210 may include all of supports provided such that the formwork may stably support the wall. The supports may be entirely connected to the formwork plate 220, the formwork plate adjuster 230, the formwork sub-plate 240, and the formwork sub-plate adjuster 250 and may support or fasten all of them. For example, a portion of the supports of the formwork base 210 may function as a joist, a yoke, or a brace of excluding three-axial positional deformation of the formwork plate 220 through coupling at an outer side and both ends of each formwork plate 220. The formwork base 210 may extend the supports functioning as joist and yoke members to protrude based on a change in a separation distance between the formwork plates 220 and to couple with a fastening hole formed in the horizontal frame 120 or the vertical frame 110 of the frame unit 100.

The formwork plate 220 is a frame for molding the structure and may include at least two formwork plates and two plates may be provided spaced apart to face each other at one end of the formwork base 210.

A material that constitutes the formwork plate 220 may vary based on the structure and the formwork plate 220 may be provided using various sizes or shapes. The formwork plate 220 may function as a unit section of a structure forming work using the structure construction apparatus 10. The unit section may be determined based on a separation distance between the formwork plates 220 and a length of the formwork plate 220.

Also, the formwork plate 220 may be detachably coupled at one end of the formwork base 210 and thus, may be replaced with a different type of the formwork plate 220 based on the structure and thereby mounted.

The formwork plate 220 in this structure may be manufactured in a small size and repetitively used. In addition, although the formwork plate 220 is damaged during the work, it is possible to replace only the formwork plate 220 without a need to replace the entire structure construction apparatus 10 or formwork unit 200. Therefore, it is possible to efficiently maintain and repair the apparatus.

Also, the formwork plate 220 may move to the construction position according to a movement of the formwork base 210. The structural material may be provided between the formwork plates 220 at the construction position. That is, an inner surface of the formwork plate 220 may make a direct contact with the structural material.

The formwork plate adjuster 230 may adjust the separation distance between the formwork plates 220. The formwork plate adjuster 230 may adjust the separation distance to match a set thickness of the structure and may maintain the adjusted separation distance. Also, when construction of the structure is completed, the formwork plate adjuster 230 may adjust the separation distance between the formwork plates 220 to detach the formwork plates 220 from the structure.

In detail, the formwork plate adjuster 230 may adjust the separation distance between the formwork plates 220 in such a manner that the formwork plates 220 move in the horizontal direction through a rotation of a shaft.

For example, an adjustment shaft coupled with a motor may be provided at one end of the formwork plate adjuster 230. A thread may be provided to the adjustment shaft. Each thread may be formed in a different winding direction from the center of the adjustment shaft. The two formwork plates 220 may be movably coupled to the left and the right of the adjustment shaft in which different threads are formed, respectively. When the adjustment shaft rotates in one direction, the two formwork plates 220 may horizontally move in different directions, thereby increasing or decreasing the separation distance. When the adjustment shaft rotates in another direction, the separation distance between the formwork plates 220 may be adjusted as opposed to the aforementioned case in which the adjustment shaft rotates in one direction.

In detail, the formwork plate adjuster 230 may include a first ball screw 231, a second ball screw 232, a bevel gear shaft 233, a first guide 234, and a second guide 235.

Two ball screws, for example, the first ball screw 231 and the second ball screw 232 and two guides, for example, the first guide 234 and the second guide 235 may be coupled to the supports of the formwork base 210 that act as a yoke or a joist and may adjust position of the formwork plates 220 or may firmly fasten the formwork plates 220.

In detail, the first ball screw 231 and the second ball screw 232 may be provided to be parallel to each other on the two formwork plates 220 and may be coupled with the supports at different ends of the two formwork plates 220, respectively. Also, the motor may be coupled at one end of the first ball screw 231.

The bevel gear shaft 233 may be provided in the same longitudinal direction as that of the formwork plate 220 and may be geared at one ends of the first ball screw 231 and the second ball screw 232.

That is, the first ball screw 231 and a connector of the bevel gear shaft 233 may be coupled in such a manner that bevel gears provided thereto, respectively, are engaged with each other. The second ball screw 232 and another connector of the bevel gear shaft 233 may be coupled in such a manner that bevel gears provided thereto, respectively, are engaged with each other.

All of the first ball screw 231, the second ball screw 232, and the bevel gear shaft 233 may simultaneously drive when the motor drives to open the formwork plates 220. Also, since a single motor simultaneously drives two ball screws, it is possible to prevent distortion of the formwork plates 220. When the formwork plates 220 are separate at a desired distance, the distance may be fixed using a motor brake.

The first guide 234 and the second guide 235 may be coupled in upper portions of the same supports as those with which the first ball screw 231 and the second ball screw 232 are coupled, respectively, so as to be parallel to the first ball screw 231 and the second ball screw 232, respectively.

The first guide 234 and the second guide 235 may prevent lower portions of the formwork plates 220 from spreading when performing a compaction work using the structure construction apparatus 10.

A material may be built in a desired shape and size under control of the aforementioned formwork plate adjuster 230.

Referring to FIG. 7, the formwork sub-plate 240 may be used as a side frame when the formwork unit 200 builds a first unit section at an initial start position of a first floor and may be used as a side frame when building a last unit section of the first floor. That is, the formwork sub-plate 240 may close the formwork plates 220 of which both ends are open in a square shape or a flattened U shape.

In detail, the formwork sub-plate 240 may include at least two plates. Guides capable of coupling with the formwork sub-plate 240 may be provided at both ends of each of the two formwork plates 220. The formwork sub-plate 240 may be coupled with the guides to be orthogonal to the two formwork plates 220 and the formwork sub-plate 240 may vertically move along the guides.

Also, when building a second unit section after building the first unit section, the formwork sub-plates 240 may consecutively build the wall by rotating one of the two formwork sub-plates 240 by 90 degrees and thereby opening the formwork plates 220.

The formwork sub-plate adjuster 250 may be fastened to the formwork base 210 above the formwork sub-plate 240.

In detail, the formwork sub-plate adjuster 250 may include at least two motors and wire.

The motor may be fastened to the support of the formwork base 210 and one end of the wire may be connected to a shaft of the motor. Another end of the wire may be connected to one side of each formwork sub-plate 240.

The formwork sub-plate adjuster 250 as above may vertically move each formwork sub-plate 240 in such a manner that the wire vertically moves by rotational driving of the motor.

Additionally, the formwork unit 200 may further include a peeling portion.

The peeling portion may be provided between the formwork plate 220 and the structure and may prevent adhesion between the formwork plate 220 and the structure.

In detail, the peeling portion may include a peeling member and a suction member.

The peeling member may detachably attach to the surface of the formwork plate 220. For example, the peeling member may be reused by repeatedly coating the paper surface reinforced with reinforced fiberglass with liquid paraffin.

Once the peeling member is provided, the peeling member is positioned between the formwork plate 220 and the structure material provided between the formwork plates 220 and thus, may prevent the structure from being damaged when the formwork plate 220 is detached from the structure.

Also, if lifespan of the peeling member is over, the peeling member may be replaced with a new peeling member and liquid paraffin may be resupplied.

In contrast to a generally used liquid peeling agent that requires a manual work, there are some advantages in that the peeling member is small and repeatedly usable and a liquid paraffine application apparatus automatically applies a peeling agent on the surface of the peeling member and the peeling member is easily replaceable by detachment.

The suction member may be provided in a form of a plurality of holes on the inner surface of the formwork plate 220. The suction member may closely fasten the peeling member to the formwork plate 220 through vacuum suction.

In the case of using the aforementioned formwork unit 200, since a formwork installation and dismantling process that generally occupies a largest construction time in a construction process is automated, it is possible to improve work efficiency and productivity. Also, the manpower required may be reduced due to automation, which may lead to saving the overall construction cost.

Hereinafter, the compacting unit 300 of the structure construction apparatus 10 according to an example embodiment is further described with reference to FIGS. 8 and 9.

Here, the compacting unit 300 may function as, for example, a rammer or a hammer, and may compact the structure material provided in the formwork unit 200 through its own weight and impact.

Figure 8:
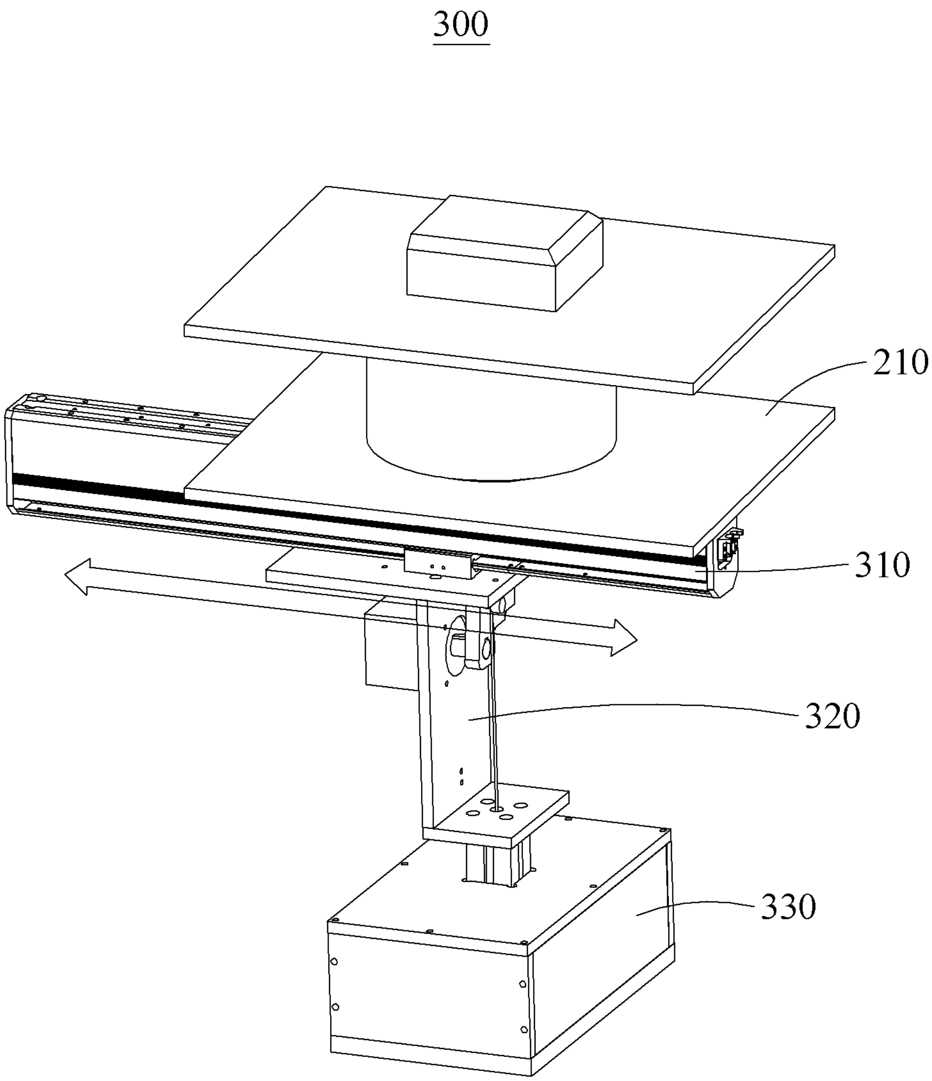
FIG. 8 illustrates a compacting unit in which a compacting portion horizontally moves along a guide portion.

FIG. 8 illustrates the compacting unit 300 in which a compacting portion 330 horizontally moves along a guide portion 310.

Figure 9:
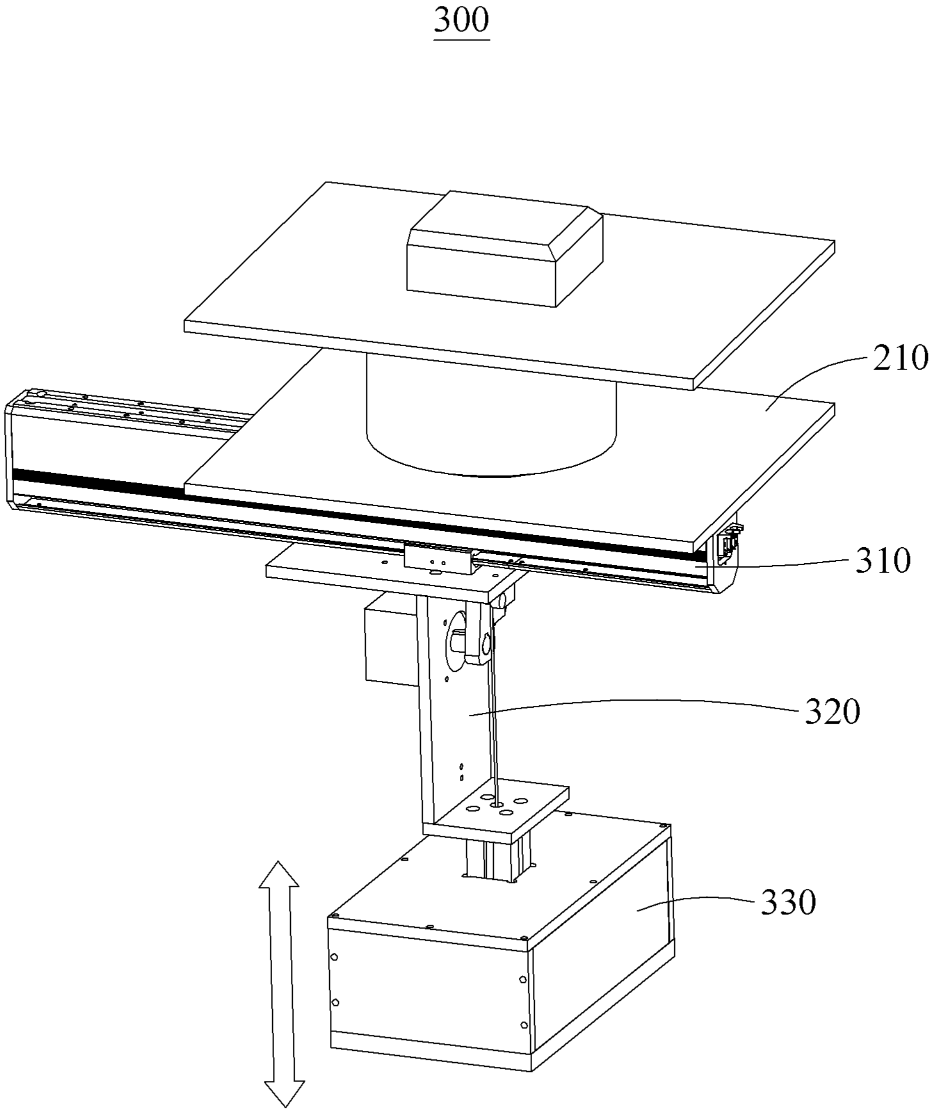
FIG. 9 illustrates a compacting unit in which a compacting portion vertically moves to compact a structural material.

FIG. 9 illustrates the compacting unit 300 in which the compacting portion 330 vertically moves to compact the structure material.

Referring to FIGS. 8 and 9, the compacting unit 300 may include the guide portion 310, a compaction base 320, and the compacting portion 330.

The guide portion 310 may be connected to the formwork unit 200 or the frame unit 100. In detail, the guide portion 310 may be connected to the formwork base 210 or the movable frame 130. Accordingly, the compacting unit 300 may horizontally move along the second rail 150 according to movement of the formwork base 210, or may horizontally move along the second rail 150 separate from the formwork base 210.

In detail, a coupling element may be provided in an upper portion of the guide portion 310 and, through this coupling element, may be coupled to be slidable on the movable frame 130. Similar to the formwork base 210, a hole through which the second rail 150 passes may be formed in the guide portion 310 and the guide portion 310 may be coupled to be movable along the second rail 150.

One end of the compaction base 320 is provided below the guide portion 310 and the compaction base 320 may be slidably coupled to the side of the guide portion 310. Accordingly, the compaction base 320 may move along a slide path provided to the guide portion 310.

The compacting portion 330 may be provided at another end of the compaction base 320. For example, the compacting portion 330 may be provided as a lump of iron, may drop on the structure material, and thereby may compact and harden the structure.

In detail, a wire may be connected to the compacting portion 330. The wire may vertically extend from the compacting portion 330 and may be connected to a motor provided to the compaction base 320. The compacting portion 330 may drop in such a manner that the wire vertically moves by rotational driving of the motor.

For example, a cam connected to a motor shaft as a camshaft may be provided to the compaction base 320. The wire may be connected to a nose portion of the cam such that the wire may vertically reciprocate through rotation of the cam relative to the camshaft. Accordingly, the connected compacting portion 330 may repeatedly drop. Alternatively, a dropping motion of the compacting portion 330 is not limited to the aforementioned method or structure. Any structure capable of implementing the compacting portion 330 that repeatedly performs a vertical motion on the structure material may be applied.

Also, while the compaction base 320 moves along the guide portion 310, an in-formwork unit position of the compacting portion 330 may move.

As described above, the compacting portion 330 may compact the structural material provided between the formwork plates 220 while repeatedly dropping in the vertical direction between the formwork plates 220 and may uniformly compact the structural material while moving within a range determined based on a shape and a size of the formwork plate 220.

Using the aforementioned compacting unit 300, it is possible to improve productivity by excluding a human safety accident that may occur during a manual work, for example, a fall from a top of a formwork or a musculoskeletal disorder attributed to vibration impact of a compactor and an increase in an idle time. Also, even a novice using the same may perform a uniform compaction work while moving an input path and thus, construct the structure with uniform quality.

Figure 10:
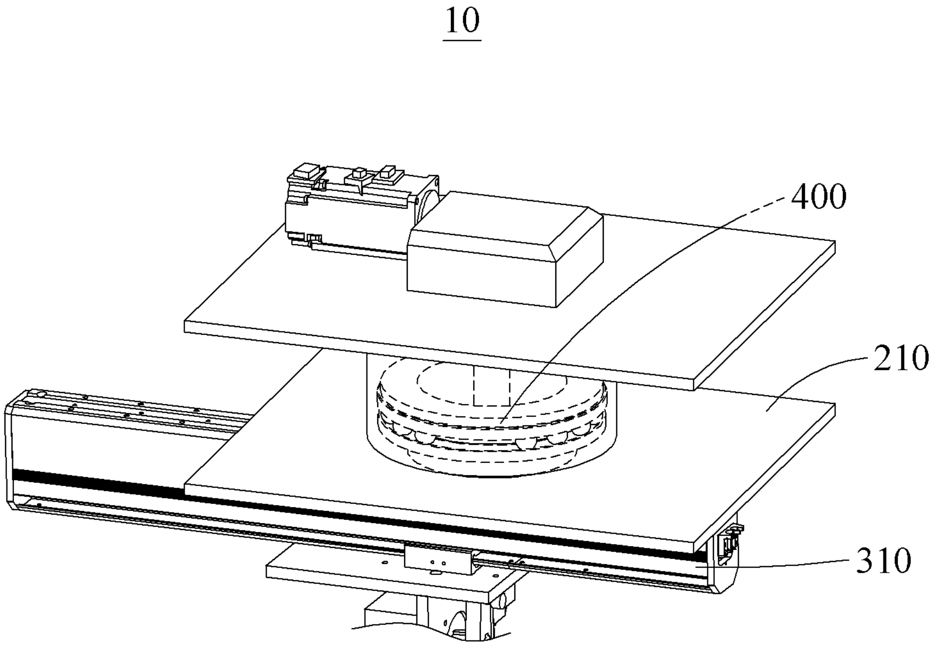
FIG. 10 illustrates a rotator coupled with a formwork unit and a compacting unit.

FIG. 10 illustrates a rotator 400 coupled to the formwork unit 200 and the compacting unit 300.

Referring to FIG. 10, the rotator 400 may be provided as a turntable provided between the formwork base 210 and the guide portion 310.

In detail, a rotational shaft of the rotator 400 may pass through and thereby couple with the formwork base 210 and the guide portion 310.

Also, a motor mounted to the rotator 400 may rotate the formwork unit 200 and the compacting unit 300 by driving at least two engaged gears in a 90-degree direction.

In detail, a worm gear may be coupled to a motor side and a spur gear may be coupled to a rotational shaft side. A shape and a size of a structure material to be constructed may be maintained by fastening positions of the formwork unit 200 and the compacting unit 300 by controlling the gear and the motor of the rotator 400.

Also, a thrust bearing is provided in the rotator 400 and may reduce friction occurring in a portion in which the rotator 400 rotates.

Accordingly, when constructing the structure, the rotator 400 may rotate the compacting unit 300 and the formwork unit 200 by 90 degrees or may restore the same to their original positions without rotating the frame unit 100, that is, the entire gantry structure. Therefore, even a bent wall may be easily poured.

Hereinafter, a structure construction method using the structure construction apparatus 10 according to an example embodiment is described with reference to FIG. 11.

Figure 11:
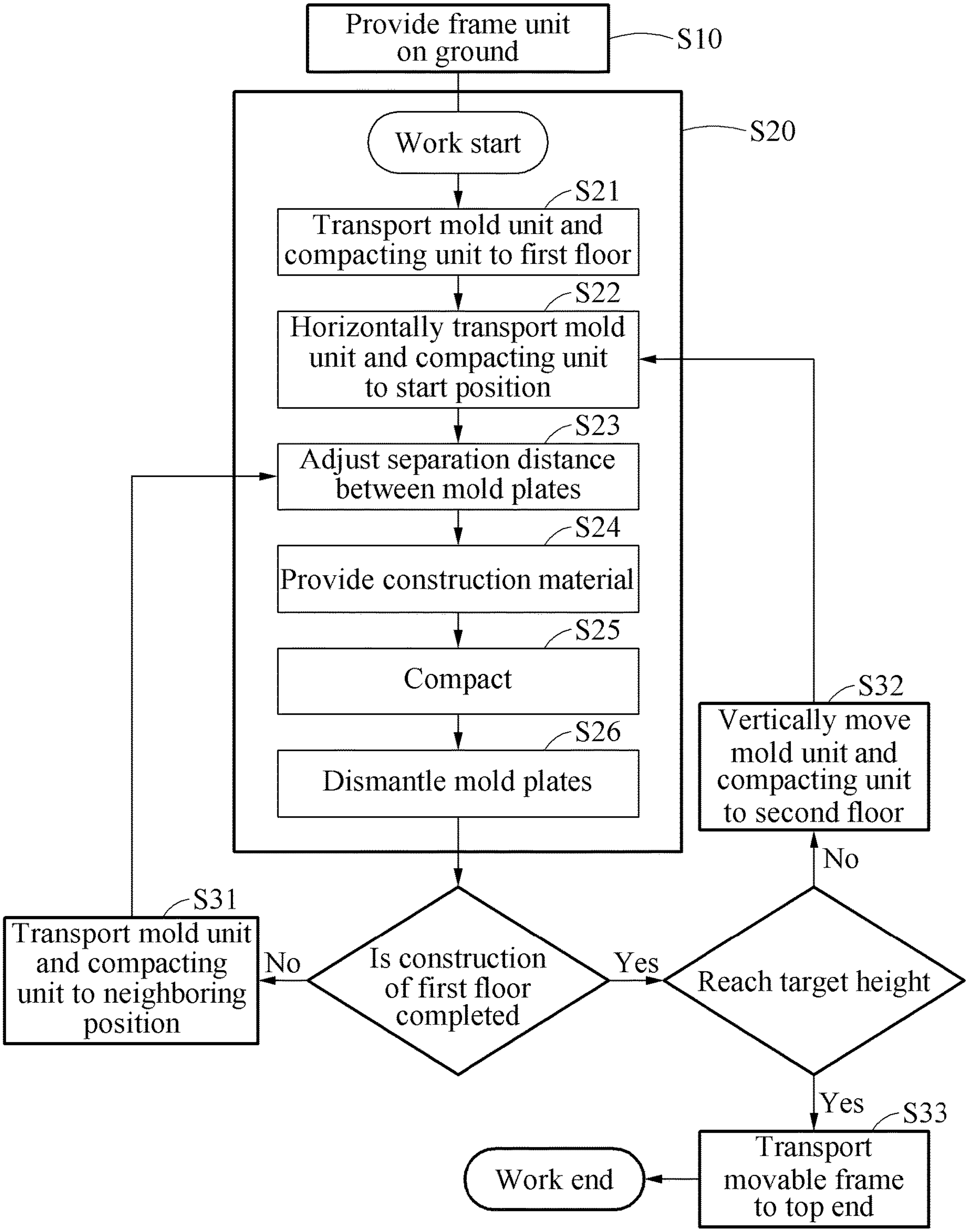
FIG. 11 is a flowchart illustrating a method of automatically constructing a structure using a structure construction apparatus according to an example embodiment.

FIG. 11 is a flowchart illustrating a method of automatically constructing a structure using the structure construction apparatus 10 according to an example embodiment.

Referring to FIG. 11, the automatic structure construction method may include the following operations:

Operation 1: providing the frame unit 100 on the ground (S10)

Operation 2: moving the formwork unit 200 to a start position of a first floor and compacting a structure material using the compacting unit 300 (S20)

Operation 3: determining whether construction of the first floor is completed (S30)

In operation 1 (S10), the frame unit 100 may move to a construction position on the ground through the frame wheel 160. When the structure construction apparatus 10 is provided at an appropriate position, the structure construction apparatus 10 may be fastened using a brake to not be deviated from the construction position.

In operation 2 (S20), a construction range and a start position for the formwork unit 200 and the compacting unit 300 to operate may be set by a controller. In detail, a user may input a thickness, a length, and a height of the structure. The controller may calculate a size of the structure based on the information and may calculate a separation distance between the formwork plates 220 and a compaction movement path of the compacting portion 330.

When the structure construction apparatus 10 starts to operate, the formwork unit 200 and the compacting unit 300 may move to the first floor, that is, a bottom floor within the construction range along the first rail 140 through a vertical movement of the movable frame 130 (S21). Here, the first floor does not indicate only a floor in contact with the ground may refer to a floor with any height from which a work starts using the structure construction apparatus 10.

Also, the formwork unit 200 and the compacting unit 300 may move to the left or to the right by horizontally moving along the second rail 150 (S22). Here, the formwork unit 200 may move to a leftmost end or a rightmost end of the second rail 150 or may move to a position within the range of the second rail 150.

Next, the separation distance between the formwork plates 220 of the formwork unit 200 may be adjusted based on a size of the structure to be constructed at a start position (S23). In detail, the separation distance between the formwork plates 220 may be adjusted by the formwork plate adjuster 230 based on a size of the structure input to the controller. When adjustment of the separation distance between the formwork plates 220 is completed, the formwork plate adjuster 230 may fasten the formwork plates 220 such that the separation distance between and positions of the formwork plates 220 may be maintained during progress of the work. Also, it is possible to extend joist and yoke members attached to the formwork base 210 to protrude as an actuator and thereby couple to a fastening hole of the frame unit 100.

The structure material may be provided between the formwork plates 220 installed as above (S24). Here, the structure material may be provided over a plurality of number of times by a quantitative amount. For example, if a height of a unit section is 20 centimeters (cm), a one-time feeding height of the structure material is 10 cm, and a volume reduction rate by compaction is 50 percentage, the structure material may be provided four times by a quantitative amount. Also, the structure material may be transported by a structure material providing unit (not shown) and dropped between the formwork plates 220. Also, the structure material provided between the formwork plates 220 may be flattened to be uniformly distributed in a formwork through a flattening unit (not shown).

The compacting unit 300 may be positioned on the structure material that is flattened between the formwork plates 220. The compacting portion 330 of the compacting unit 300 may compact the structure material while moving within a unit section determined by the formwork plates 220 (S25). That is, the compacting portion 330 may uniformly compact the structural material within the unit section while moving from one end to another end of the formwork plate 220 based on a size of the formwork plate 220 input to the controller. The compacting portion 330 may move on the structure material through the compaction base 320 that moves along the guide portion 310. This movement path may be determined based on a shape of the guide portion 310, or may be determined based on a compaction movement path input to or calculated by the controller.

Here, a compaction level, a compaction speed, and a number of compactions may be adjusted by controlling a vertical operation of the compacting portion 330 for a compaction work and a rotation speed of the motor. Likewise, variables may be controlled by inputting, by the user, in advance the variables to the controller. Also, using a proximity sensor, a compaction measurer (not shown) attached to an upper one side of the formwork plate 220 may measure a depth of the formwork before dropping the structural material between the formwork plates 220 and a depth of the formwork after the material is provided once and flattening of the material is completed, may weigh the volume of the once-provided structure material based on such depth values, may measure a depth of the formwork after compaction is completed, and may determine whether compaction quality requirements are met.

When all the compaction work of the compacting portion 330 within the unit section is completed, the compacting portion 330 may stop movement and operation and the formwork plate adjuster 230 may adjust the separation distance between the formwork plates 220 in a direction in which the formwork plates 220 are deviated from the structure (S26).

When construction of the unit section is completed, the structure construction apparatus 10 may determine whether construction of the first floor is completed and may determine a subsequent operation (S30).

When the controller determines that all the construction from one end to another end of the first floor currently being worked is not completed, the movable frame 130 may not move and the formwork unit 200 and the compacting unit 300 may horizontally move to a neighboring position to the right or to the left along the second rail 150 (S31). Next, the aforementioned process of installing and fastening the formwork plates 220 at the neighboring position through the formwork unit 200 and compacting the structure material through the compacting unit 300 may be repeated again (S23-S26). The aforementioned process may be repeated until all the construction from one end to the other end of the first floor is completed (S23-S31).

When the controller determines that all the construction from one end to another end of the first floor currently being worked is completed, the controller may vertically move the formwork unit 200 and the compacting unit 300 to a height of a second floor by vertically moving the movable frame 130 along the first rail 140 (S32). The movable frame 130 may be fastened again at a corresponding position and the formwork unit 200 and the compacting unit 300 may move to a start position of the second floor along the second rail 150 (S22). As described above, after movement, the formwork unit 200 may install and fasten the formwork plate 220 at the start position of the second floor and the compacting unit 300 may compact a structure material provided to the second floor (S23-S26).

When construction of a single unit section of the second floor is completed, the controller may determine whether construction of the second floor is completed and may repeat an installation and dismantling of the formwork plates 220 and a compaction process of the compacting portion 330 until all the construction from one end to the other end of the second floor is completed (S23-S31).

The vertical movement of the movable frame 130 may be repeated until the structure reaches a set target height.

When it is determined that the structure reaches the target height and construction of a top floor is also completed, the controller may transport the movable frame 130 to a top end (S33). Through this, a construction process using the structure construction apparatus 10 may be terminated.

By using the structure construction apparatus 10 according to an example embodiment, it is possible to improve work efficiency and productivity by automating a structure construction process that includes installing, dismantling, and relocating a formwork, and flattening and compacting a structural material. Also, it is possible to construct a standardized structure of uniform quality using the minimum manpower.

While the example embodiments of the present invention are described with reference to specific matters such as detailed components, limited example embodiments, and the accompanying drawings, they are merely provided to assist the overall understanding of the invention and it will be apparent to one of ordinary skill in the art that various alterations and modifications in form and details may be made in these example embodiments from the description. For example, suitable results may be achieved if the described techniques are performed in different order, and/or if components in a described architecture, device, etc., are combined in a different manner, or replaced or supplemented by other components or their equivalents. Therefore, the spirit of the invention should not be limited to the example embodiments described herein and the following claims and equivalents thereof or equivalent modifications thereof are within the scope of the present invention.

What is claimed is:

1. A structure construction apparatus comprising:

a frame unit provided on a ground on which a structure is to be constructed;

a formwork unit mounted on the frame unit and configured to maintain a structural material in a form to be constructed; and a compacting unit provided to be adjacent to the formwork unit and configured to compact the structural material provided in the formwork unit, wherein the formwork unit and the compacting unit are configured to move through the frame unit and to automatically construct the structure, wherein the formwork unit comprises:

a formwork base movably mounted on the frame unit;

at least two formwork plates spaced apart to face each other at one end of the formwork base, wherein the formwork base is configured to move the at least two formwork plates to a construction position along the frame unit, and the structural material is provided between the at least two formwork plates; and a formwork plate adjuster configured to adjust a separation distance between the at least two formwork plates, wherein the formwork plate adjuster is configured to adjust and maintain the separation distance between the at least two formwork plates to match a thickness of the structure, and the formwork plate adjuster is configured to remove the at least two formwork plates from the structure when construction of the structure is completed, wherein the formwork plate adjuster comprises:

a first ball screw horizontally provided at one end of each of the at least two formwork plates;

a second ball screw provided to be parallel to the first ball screw at another end of each of the at least two formwork plates; and a bevel gear shaft provided to be orthogonal to the first ball screw and the second ball screw, wherein both ends of the bevel gear shaft are geared at one end of the first ball screw and one end of the second ball screw, respectively, and the separation distance between the at least two formwork plates is adjusted by rotational driving of the first ball screw.

2. The structure construction apparatus of claim 1, wherein the frame unit comprises:

vertical frames configured to erect at positions spaced apart at both sides, respectively, based on a construction position;

a horizontal frame provided horizontally relative to the ground between the vertical frames; and a pair of movable frames each being configured to be movable in a vertical direction along the vertical frames, and the formwork unit and the compacting unit are mounted to the movable frame.

3. The structure construction apparatus of claim 2, wherein the frame unit further comprises:

a first rail installed between the vertical frames; and a second rail installed between the pair of movable frames, each of the pair of movable frames is configured to be movable in the vertical direction along the first rail, the formwork unit and the compacting unit are configured to be movable in a horizonal direction along the second rail, and the formwork unit and the compacting unit are configured to move to the construction position along the first rail or the second rail and to consecutively construct the structure.

4. The structure construction apparatus of claim 2, wherein the frame unit further comprises a frame wheel mounted at a lower end of the vertical frame, and the frame wheel is detachably mounted to one of the vertical frames and a height of the vertical frame is adjusted.

5. The structure construction apparatus of claim 1, wherein the compacting unit comprises:

a guide portion connected to the formwork unit or the frame unit;

a compaction base configured to move along the guide portion; and a compacting portion provided at one end of the compaction base, the compacting portion is configured to perform a repetitive movement in a vertical direction within the formwork unit and to compact the structure material provided to the formwork unit, and the compaction base is configured to move a position of the compacting portion in the formwork unit while moving along the guide portion.

6. The structure construction apparatus of claim 1, further comprising:

a rotator positioned above the formwork unit and the compacting unit, wherein the rotator is configured to change a construction direction by rotating the formwork unit and the compacting unit.

7. The structure construction apparatus of claim 1, wherein the formwork unit comprises:

at least two formwork sub-plates spaced apart to face each other at both ends of the at least two formwork plates; and a formwork sub-plate adjuster configured to move the formwork sub-plates in a vertical direction, and each of the at least two formwork sub-plates is controlled in the vertical direction by the formwork sub-plate adjuster to open and close one of the both ends of the at least two formwork plates.

* * * * *